United States Patent

[11] 3,587,777

| [72] | Inventor | Peter H. Ellis |
| | | Chula Vista, Calif. |
| [21] | Appl. No. | 868,875 |
| [22] | Filed | Oct. 23, 1969 |
| [45] | Patented | June 28, 1971 |
| [73] | Assignee | Rohr Corporation |
| | | San Diego, Calif. |

[54] TURBOFAN PROPULSION APPARATUS WITH SILENCER AND OPERATING METHOD
10 Claims, 2 Drawing Figs.

[52] U.S. Cl. ...................................... 181/33HC,
181/51, 239/127.3, 239/265.17
[51] Int. Cl. ...................................... B64d 33/06
[50] Field of Search ........................... 181/33, 43,
51, 46, 56, 60, 33.22, 33.221, 33.232; 239/127.3,
265.11, 265.13, 265.17

[56] References Cited
UNITED STATES PATENTS
3,002,341  10/1961  Muzzy et al. ................ 181/33(.221)
3,053,340  9/1962  Kutney ........................ 181/33(.221)
3,227,240  1/1966  Lee et al. ..................... 239/127.3X
3,262,264  7/1966  Gardiner et al. ............. 239/127.3X

*Primary Examiner*—Robert S. Ward, Jr.
*Attorney*—George E. Pearson

ABSTRACT: Lobed nozzle is attached to aft end of housing spaced around turbofan engine, fan air of the latter flowing through gap between housing and engine casing and then through lobe passages of said nozzle. Hollow, frustoconical inner member is disposed within the nozzle and attached at its base to aft end of engine casing. Pipes are mounted on outer side of inner member in rows extending axially thereof and respectively radially aligned with lobe passages, the pipes communicating with interior of inner member so that engine exhaust gas is discharged therethrough into said lobe passages, where it mixes with fan air. Slipstream air flows between nozzle lobes and then between streams of combined exhaust gas and fan air issuing from the lobe passages.

PATENTED JUN28 1971　　3,587,777

INVENTOR.
PETER H. ELLIS
BY
*Edwin D. Grant*
ATTORNEY

TURBOFAN PROPULSION APPARATUS WITH SILENCER AND OPERATING METHOD

SUMMARY OF THE INVENTION

This invention relates to jet propulsion and more particularly to both a method and apparatus for reducing the noise of operation of a turbofan engine.

In accordance with the principles of the invention disclosed herein, the temperature and velocity of the thrust-producing jet stream of an aircraft turbofan engine is reduced by mixing exhaust gas and fan air of said engine within a nozzle assembly of improved design, and by mixing slipstream air with the combined exhaust gas and fan air discharged from said assembly. Since the amount of noise generated by the flow of aircraft jet streams through the atmosphere has been shown to be proportionate to their temperature and velocity, the invention thus provides an effective means for suppressing noise of jet-propelled aircraft. More particularly, in the preferred apparatus and operating method of the present invention a tubular housing is concentrically spaced around the casing of a turbofan engine, and a lobed thrust nozzle is coaxially mounted on the aft end of said housing. Fan air of the engine is conducted through suitable ducts to the annulus between the housing and engine casing, from whence it flows into the aforesaid nozzle. A tubular inner member, generally frustoconical in shape, is coaxially disposed within and spaced from the wall of the nozzle, the base of said inner member being attached to the aft edge of the engine casing. A plurality of exhaust pipes are mounted on the outer side of the inner member and respectively communicate with the interior of said member through apertures in the wall thereof. The exhaust pipes are arranged in rows which extend axially of the inner member and which are spaced apart circumferentially thereof and respectively radially aligned with the passages extending through the lobes of the nozzle. Each exhaust pipe extends laterally from the wall of the inner member and is inclined in the downstream direction, and the free ends of the exhaust pipes terminate adjacent the innermost portions of the wall of the nozzle. An elongate nozzle plug is attached at one end thereof to the aft bearing housing of the turbofan engine and comprises a cylindrical forward portion which extends in spaced relation through the annular aft end of the inner member and through the space disposed between the latter and the aft end of the nozzle, and a generally conical rear portion which projects downstream from said nozzle. Hence exhaust gas of the engine is discharged into the space between the nozzle plug and the inner member, and the larger portion of said gas then flows through the exhaust pipes associated with said inner member and is discharged in separate streams into the passages of the nozzle lobes, the remainder of the gas flowing through the gap between said nozzle plug and the aft end of said inner member. Fan air flowing through the lobe passages mixes with the streams of exhaust gas discharged from the exhaust pipes, and the mixture of fan air and exhaust gas then flows to the atmosphere in streams spaced apart circumferentially of the nozzle and alternately disposed between streams of slipstream air flowing through the lobes thereof.

DETAILED DESCRIPTION

Figure 1:
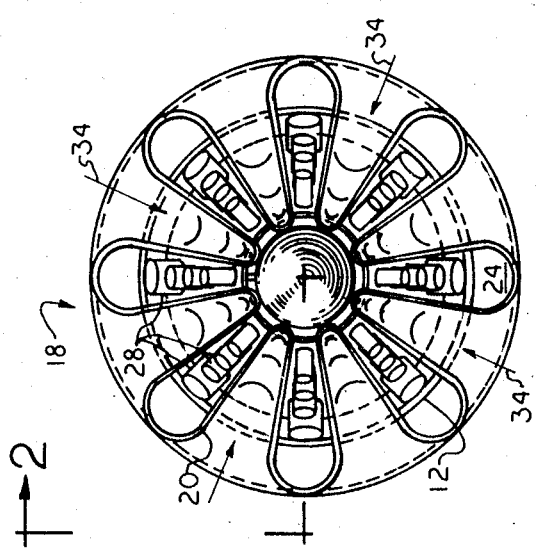
FIG. 1 is a rear elevation of the preferred embodiment of the invention.

As illustrated in the drawings, the preferred embodiment of this invention comprises a tubular housing 10 which is concentrically spaced around a tube 12, the latter in turn being concentrically spaced around the casing 14 of a turbofan engine and connected thereto by means of a flange 16. For the purpose of interpretation of claims appended hereto, tube 12 may be considered to be part of engine casing 14. The aft edges of the housing, tube, and casing lie in a plane disposed perpendicular to their common longitudinal axis. In the illustrated embodiment of the invention, the annular gap 13 between housing 10 and tube 12 extends to the fan section of the engine. However, in other embodiments there may be an annular gap at the aft portion of the housing only, and fan air of the engine is conducted to this annular gap through a bifurcated cut arrangement.

Mounted on the aft end of housing 10 is a lobed thrust nozzle, generally designated by the number 18. MOre explicitly, nozzle 18 is formed with a circular forward edge which is secured to the aft edge of the housing by suitable means, and the wall of said nozzle is formed with axially extending corrogations the depth of which gradually increases in the downstream direction. Thus the aft edge of the nozzle has a daisy petal shape, as illustrated in FIG. 1, and the nozzle includes a plurality of lobes 20 which are circumferentially spaced thereon and which increase in radial dimension in the downstream direction.

Figure 2:
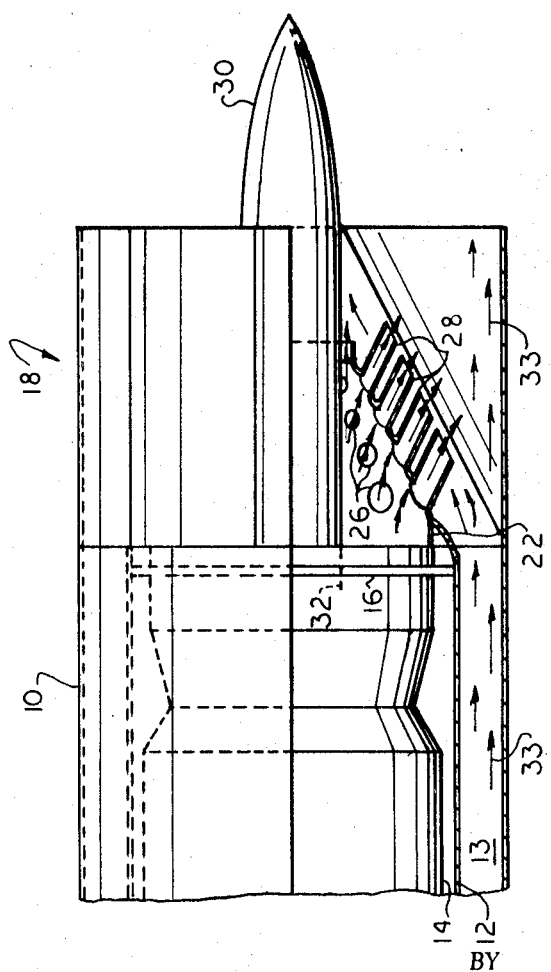
FIG. 2 is a side elevation of the same embodiment, with a quarter-section thereof being removed in the drawing along the planes represented by line 2-2 in FIG. 1, so as to show internal components.

FIG. 2 illustrates a section of a hollow, frustoconical inner member 22 the forward edge of which is attached to the aft edge of casing 14 and the smaller-diameter aft end of which is spaced forward from the aft end of nozzle 18, said inner member being coaxial with said nozzle and evenly spaced inwardly from the innermost portions of the wall of the latter. Extending through the wall of the inner member and arranged in axially extending rows respectively aligned with the passages 24 defined by lobes 20 are a plurality of apertures 26. The diameters of the apertures in each row progressively decrease in the downstream direction, and an exhaust pipe 28 is mounted on the outer side of the inner member in register with each hole and projects outwardly toward the adjacent portion of the wall of nozzle 18, the longitudinal axes of the exhaust pipes in the respective rows thereof lying in a plane which passes through the common longitudinal axis of the nozzle and inner member and being parallel to one another and inclined rearwardly. The diameters of the exhaust pipes in each row also progressively decrease in the downstream direction and their free ends terminate adjacent the innermost portions of the nozzle wall.

An elongate nozzle plug 30 is mounted on the aft bearing housing 32 of the turbofan engine and extends through inner member 22 and nozzle 18 in coaxial relation therewith. More particularly, the nozzle plug is cylindrical between said aft bearing housing and the aft end of the nozzle and the aft portion thereof tapers to a point and projects rearwardly from said nozzle, the inner portions of the aft edge of the nozzle being attached to said nozzle plug and the aft end of inner member 22 being concentrically spaced therearound.

OPERATION

In FIG. 2 double-headed arrows represent the flow of exhaust gas of the turbofan engine through exhaust pipes 28 and through the gap between the aft end of inner member 22 and nozzle plug 30. In the same drawing single-headed arrows 33 represent the flow of fan air of the engine through the annular gap 13 between housing 10 and tube 12 and into nozzle 18, a portion of said fan air flowing inwardly and around exhaust pipes 28 and the remainder entering the lobe passages 24 at the forward end of said nozzle and mixing with exhaust gas discharged from said exhaust pipes. Thus streams of intermixed fan air and exhaust gas are discharged from the exits of lobes 20, and slipstream air flows between said lobes on the outer side thereof and thence between (and around the periphery of ) the mixed streams , this slipstream air being represented by single-headed arrows 34 in FIG. 1.

It will thus be recognized that the described and illustrated apparatus provides for rapid and thorough mixing of hot, high-velocity exhaust gas of a turbofan engine with cool, relatively low-velocity air. For the reasons previously considered herein this mixing action effectively suppresses the noise of operation of the propulsion assembly. It will also by understood that various changes and modifications of the preferred embodiment of the invention which has been disclosed in detail are possible in the light of its teachings. For example, in other embodiments all or part of nozzle plug 30 may be omitted. Hence the scope of the invention is to be considered as being limited only by the terms of the claims appended hereto.

I claim:

1. In combination with an aircraft having a turbofan engine, a tubular housing disposed around the aft portion of the casing of said engine and substantially coterminous with the aft end thereof, a thrust nozzle attached to and extending downstream from the aft edge of said housing, said nozzle being exposed to the atmosphere and formed with a plurality of circumferentially spaced, axially extending lobes which increase in radial dimension in the downstream direction, fan air of said engine being discharged into said nozzle, and a plurality of exhaust pipes communicatively connected to the exit of said engine so that its exhaust gas discharges therethrough and into the lobe passages of said nozzle, whereby said fan air flows into said lobe passages and mixes with said exhaust gas therein and slipstream air flows between said lobes and thence between the streams of intermixed exhaust gas and fan air issuing therefrom.

2. The combination defined in claim 1 wherein said exhaust pipes are arranged in rows which extend axially of said nozzle.

3. The combination defined in claim 1 wherein said exhaust pipes are mounted in axially extending rows on the outer side of a hollow, frustoconical inner member the base of which is attached to the aft edge of said casing, said exhaust pipes being respectively in register with apertures in the wall of said inner member.

4. The combination defined in claim 3 including a nozzle plug mounted on the central portion of the aft end of said engine and extending to the aft end of said inner member in coaxial relation therewith.

5. In combination with an aircraft having a turbofan engine, a tubular housing spaced around the aft portion of the casing of said engine and substantially coterminous with the aft end thereof, fan air of said engine being discharged through the space between said housing and said casing, a thrust nozzle attached to and extending downstream from the aft edge of said housing, said nozzle being exposed to the atmosphere and formed with a plurality of circumferentially spaced, axially extending lobes which increase in radial dimension in the downstream direction, a hollow, frustoconical inner member attached at its base to the aft edge of said inner member and coaxially disposed within said nozzle, the wall of said inner nozzle having a plurality of apertures extending therethrough in rows which extend axially of said nozzle and are respectively radially aligned with the lobe passages thereof, a plurality of exhaust pipes mounted on the outer side of said inner member and respectively in register with said apertures, said exhaust pipes extending outwardly and rearwardly relative to said lobes and respectively terminating in the vicinity thereof, and an elongate nozzle plug mounted on the central portion of the aft end of said engine and extending through said inner member and said nozzle in coaxial relation therewith, whereby said exhaust gas flows through said exhaust pipes and into said lobe passages, said fan air flows into said lobe passages and mixes with said exhaust gas therein, and slipstream air flows between said lobes and thence between the streams of intermixed exhaust gas and fan air issuing therefrom.

6. The combination defined in claim 5 wherein the aft end of said inner member is spaced from said plug.

7. The combination defined in claim 5 wherein the inner portions of the aft edge of said nozzle are attached to said nozzle plug.

8. A method of operating an aircraft fan-jet engine, which comprises discharging fan air of said engine into the lobes of a corrugated thrust nozzle the outer surface of which is exposed to the atmosphere, and simultaneously discharging separate streams of exhaust gas of said engine into said lobes.

9. The method defined in claim 8 wherein a plurality of separate streams of said exhaust gas are discharged into each of said lobes in rows which extend axially of said nozzle.

10. The method defined in claim 9 wherein each of said streams of exhaust gas is discharged outwardly and rearwardly relative to said lobes.